(12) United States Patent
Quinn

(10) Patent No.: US 9,027,190 B2
(45) Date of Patent: May 12, 2015

(54) SYSTEM FOR REMOVING SNOW FROM VEHICLES

(75) Inventor: James D. Quinn, Waterford (CA)

(73) Assignee: Diane Quinn, Waterford, Ontario (CA)

( * ) Notice: Subject to any disclaimer, the term of this patent is extended or adjusted under 35 U.S.C. 154(b) by 0 days.

(21) Appl. No.: 13/047,528

(22) Filed: Mar. 14, 2011

(65) Prior Publication Data

US 2012/0233793 A1    Sep. 20, 2012

(51) Int. Cl.
*B60S 3/04*     (2006.01)

(52) U.S. Cl.
CPC .......................................... *B60S 3/04* (2013.01)

(58) Field of Classification Search
USPC ......... 15/3, 53.1, 53.3, 97.1, DIG. 2; 134/123
See application file for complete search history.

(56) References Cited

U.S. PATENT DOCUMENTS

| | | | | |
|---|---|---|---|---|
| 3,731,332 | A * | 5/1973 | Bernardi | 15/53.3 |
| 3,783,466 | A * | 1/1974 | Bernardi | 15/53.2 |
| 3,816,869 | A * | 6/1974 | Ennis | 15/53.3 |
| 5,613,260 | A * | 3/1997 | Belanger et al. | 15/53.3 |
| 5,802,654 | A | 9/1998 | Yeaglin | |
| 5,989,356 | A * | 11/1999 | Candeletti | 134/6 |
| 6,453,500 | B1 | 9/2002 | Schmitt | |
| 6,654,978 | B2 * | 12/2003 | Bouchard | 15/3 |
| 7,219,385 | B1 * | 5/2007 | Rietsch, Jr. | 15/97.3 |
| 7,318,245 | B2 * | 1/2008 | Ballard et al. | 15/97.3 |
| 7,559,268 | B2 * | 7/2009 | Sasaki et al. | 83/100 |
| 7,617,561 | B2 | 11/2009 | Couture | |
| 7,757,593 | B2 * | 7/2010 | Takase et al. | 83/471.3 |
| 8,099,816 | B2 * | 1/2012 | MacNeil | 15/53.3 |
| 2002/0166265 | A1 | 11/2002 | Shaw | |
| 2007/0074357 | A1 | 4/2007 | Reed | |
| 2009/0282630 | A1 | 11/2009 | Reed | |

FOREIGN PATENT DOCUMENTS

| | | |
|---|---|---|
| CA | 2 553 360 | 1/2008 |
| CA | 2 576 692 | 7/2008 |

* cited by examiner

*Primary Examiner* — Monica Carter
*Assistant Examiner* — Michael Jennings
(74) *Attorney, Agent, or Firm* — Richard C. Litman

(57) ABSTRACT

The system for removing snow from vehicles removes snow, ice and other debris from the roof of a vehicle, such as a truck, trailer, van or the like, as the vehicle drives therethrough. The system includes a frame defining an open inner region dimensioned and configured for passage of the vehicle. The frame includes a pair of laterally opposed posts and an upper crossbeam extending between upper ends of the posts. A pair of arms are pivotally attached to the posts, the pair of arms extending orthogonal to the plane of the frame. A pivotally mounted forward crossbar extends between forward ends of the pair of arms. A blade is mounted on the forward crossbar so that the blade removes the snow, ice and other debris from the roof of the vehicle as it passes through the frame.

17 Claims, 5 Drawing Sheets

SYSTEM FOR REMOVING SNOW FROM VEHICLES

BACKGROUND OF THE INVENTION

1. Field of the Invention

The present invention relates to the removal of snow, ice, and other debris from vehicles, and particularly to a system for removing snow from vehicles that removes snow, ice and other debris from a flat surface of a vehicle, such as the vehicle's roof.

2. Description of the Related Art

Snow, ice and other debris commonly accumulate on flat vehicle surfaces. Not only does such accumulation increase the overall weight of the vehicle, thus decreasing efficiency, but it must be removed in order to prevent hazards to other drivers. When the vehicle is driven, the ice, snow, and other debris may fly from the vehicle surface and land on the road behind the vehicle, or upon another vehicle, thus creating dangerous conditions.

Due to decreases in efficiency, the necessity of clearing cargo space, and the potential hazards caused by these weather-related conditions, the clearing of snow, ice, and debris is of considerable interest in the trucking and bus industries. Trucking companies and bus lines spend considerable amounts of time and money clearing snow and ice from vehicles after every snowstorm. Due to the great effort involved, operation of the trucks or buses of a large fleet can be delayed significantly after a snowstorm. Furthermore, since snow and ice removal is typically performed manually by workers shoveling from atop the truck bed or bus roof, there is a significant hazard for the workers, who may slip and fall from the raised bed or roof.

Thus, a system for removing snow from vehicles solving the aforementioned problems is desired.

SUMMARY OF THE INVENTION

The system for removing snow from vehicles is a purely mechanical system that removes snow, ice and other debris from the roof of a vehicle, such as a truck, trailer, van or the like, as the vehicle drives therethrough. The system includes a frame defining an open inner region dimensioned and configured for passage of the vehicle therethrough. The frame includes a pair of laterally opposed posts and an upper crossbeam secured to, and extending between, upper ends of the posts. A pair of arms are pivotally secured to the posts, the pair of arms extending substantially orthogonal to the plane of the frame.

A forward crossbar is pivotally mounted between forward ends of the arms. A blade is mounted on the forward crossbar so that the blade removes the snow, ice and other debris from the roof of the vehicle as it passes through the frame.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
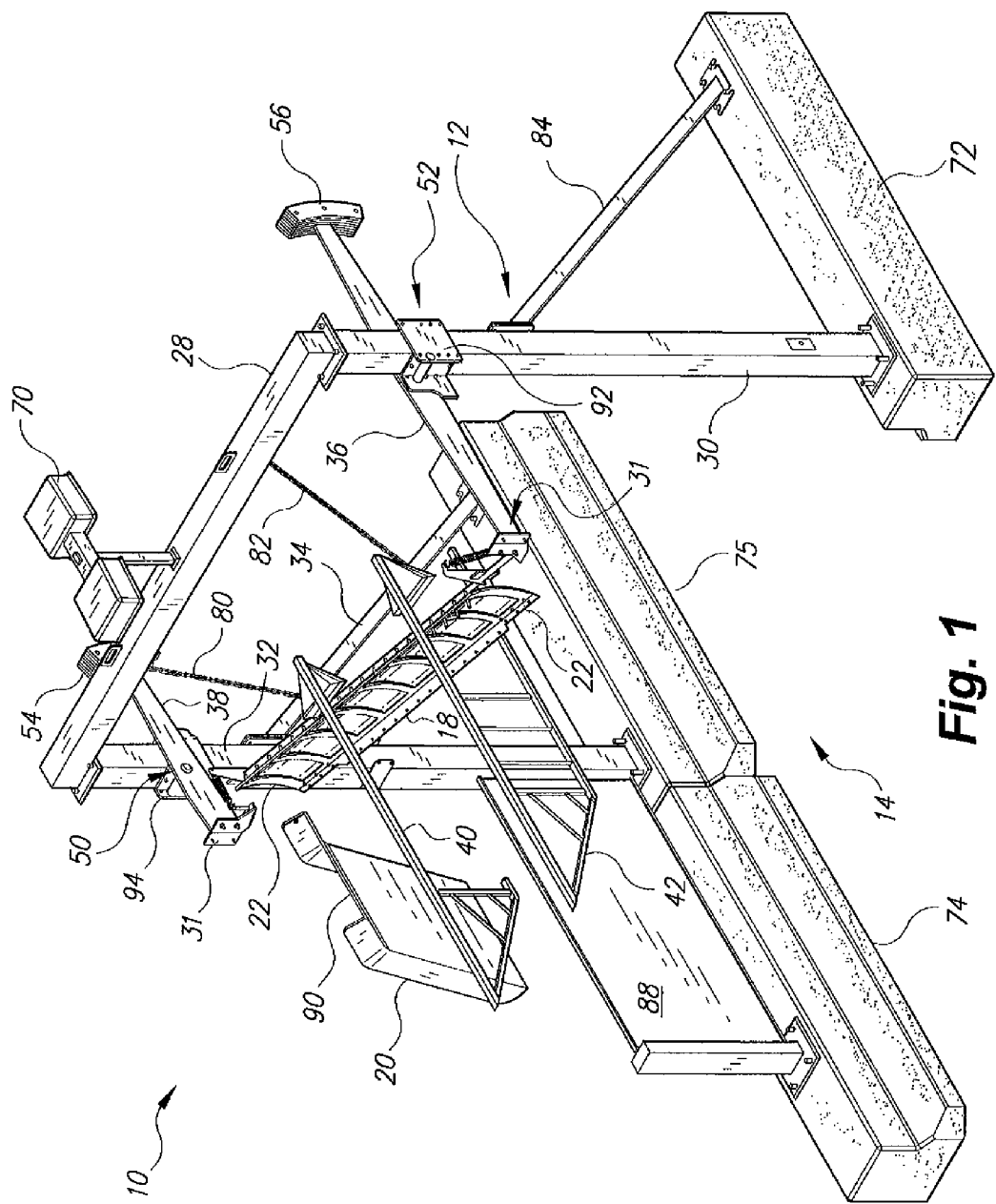
FIG. 1 is a perspective view of a system for removing snow from vehicles according to the present invention.
Figure 2:
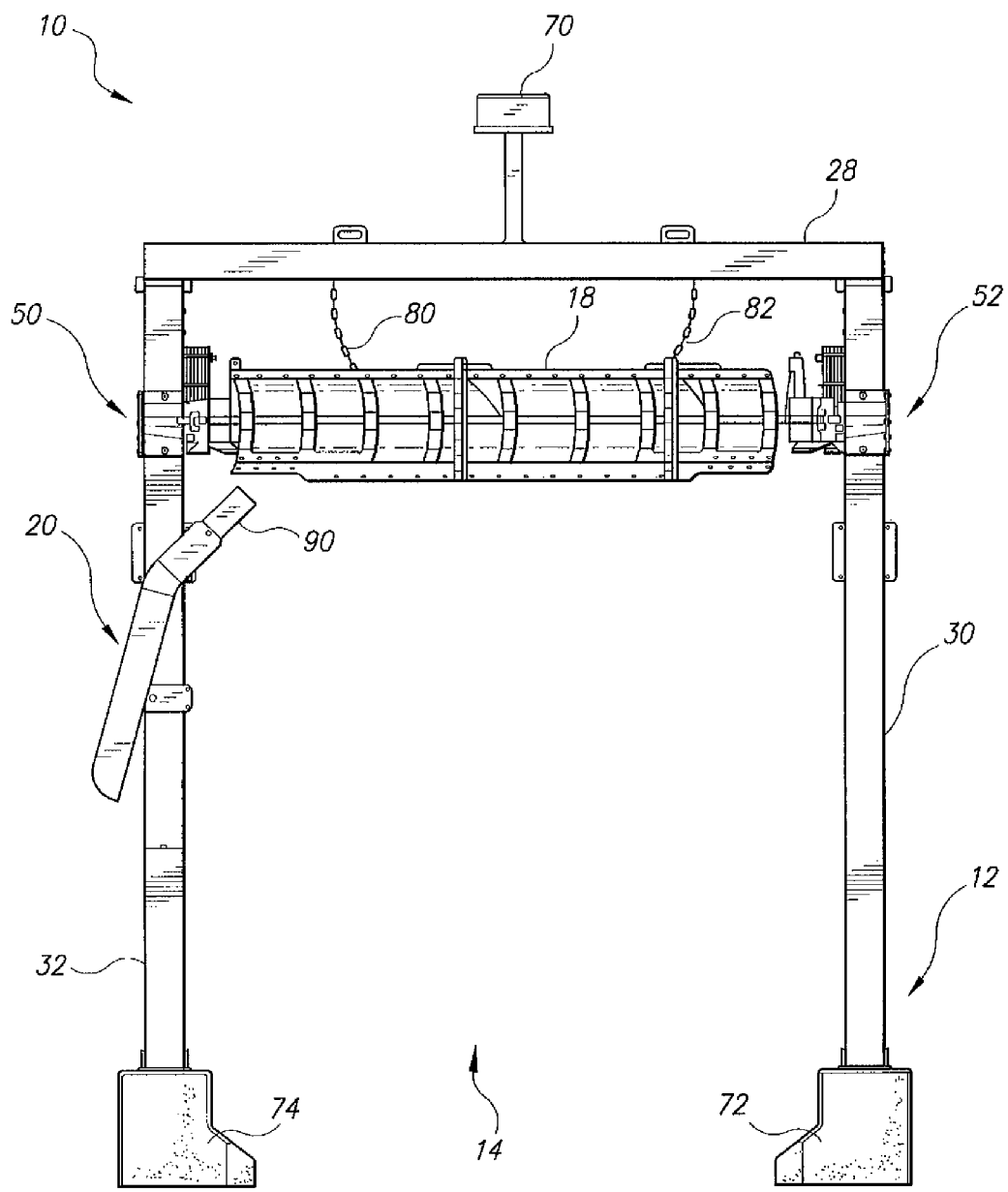
FIG. 2 is a front view of the system for removing snow from vehicles according to the present invention.

As best shown in FIGS. 1 and 2, the system for removing snow from vehicles 10 includes a generally planar, inverted U-shaped frame 12 defining a central open region 14 dimensioned and configured so that vehicles, such as trucks, trailers, vans or the like, may be driven therethrough. A blade 18 is pivotally mounted to the frame 12, the blade 18 being positioned immediately above the roof of a vehicle being driven through region 14 and oriented to scrape or clear snow, ice or other debris from the roof thereof as the vehicle passes through frame 12.

Figure 3:
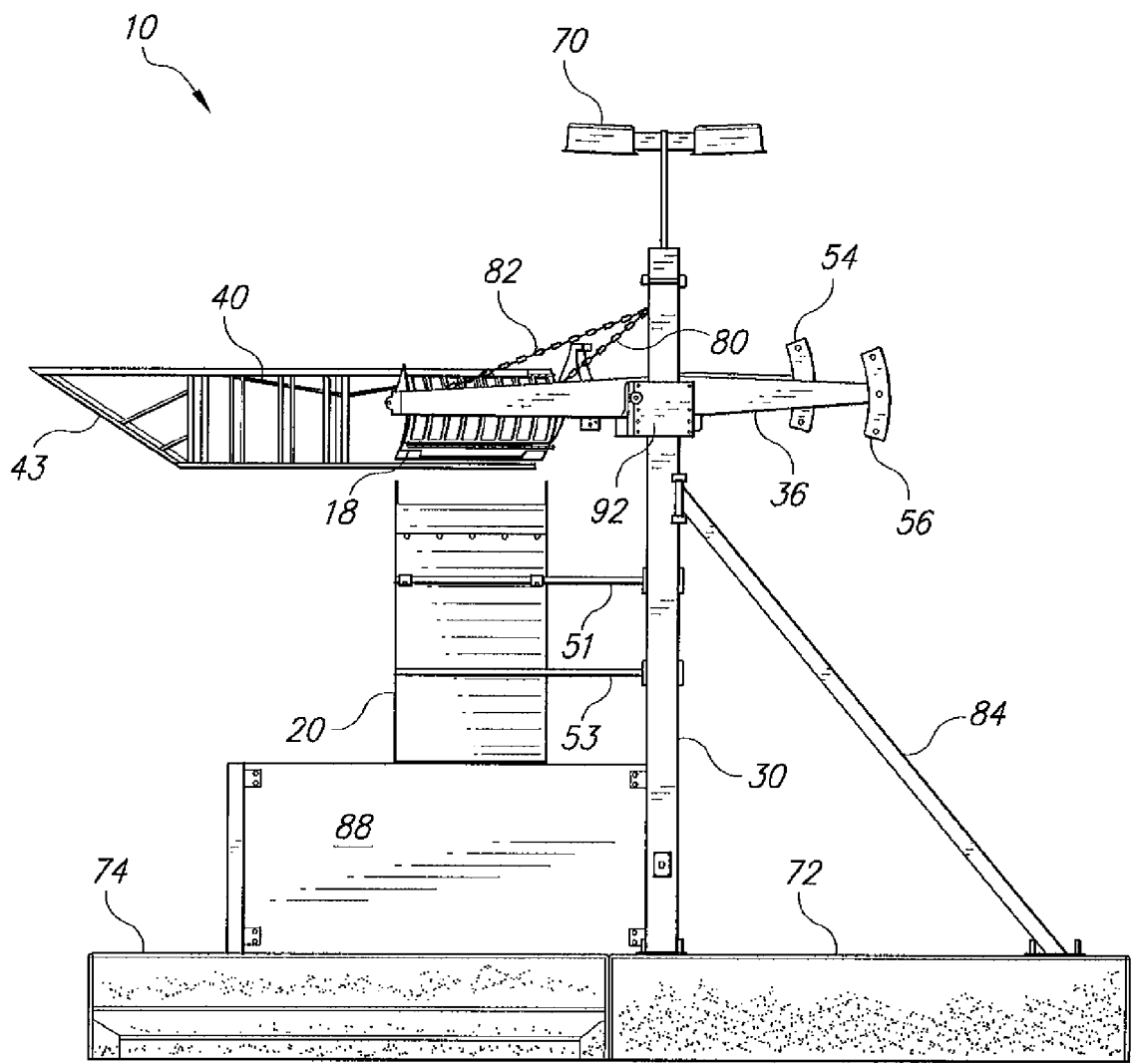
FIG. 3 is a side view of the system for removing snow from vehicles according to the present invention.
Figure 5:
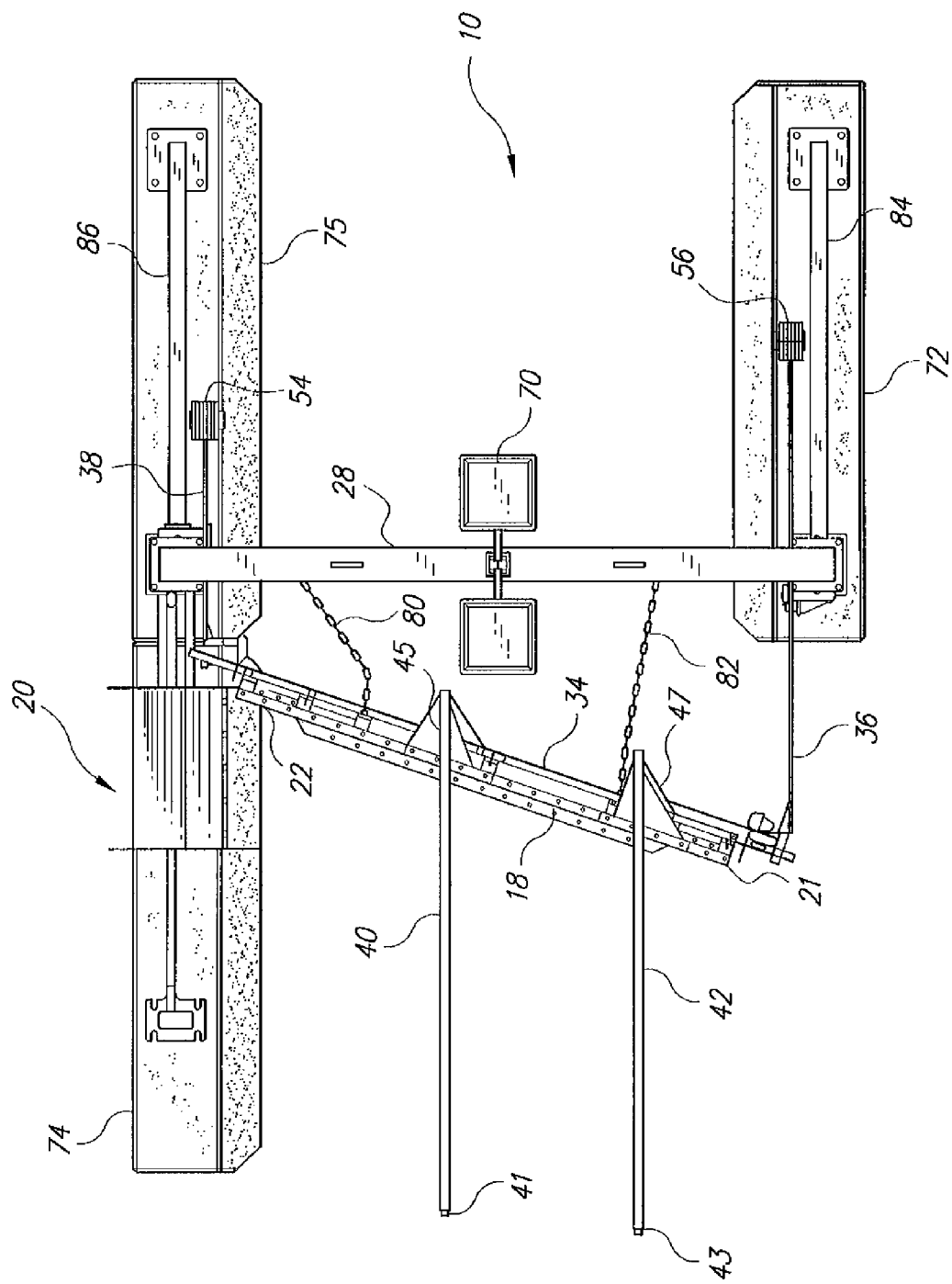
FIG. 5 is a top view of the system for removing snow from vehicles according to the present invention.

As best shown in FIG. 5, the blade 18 has opposed ends 21, 22 angled so that one end 21 is forward of the opposite end 22 (with respect to a longitudinal axis of FIG. 5). Thus, snow or other debris on the vehicle roof will be swept towards end 22 as the vehicle passes through the frame 12. As shown in FIGS. 1 and 3, a chute 20 is secured to a post or vertical support 32 of the frame 12 by supports 51, 53, which extend forward from the post 32. As best seen in FIG. 2, the upper end 90 of chute 20 is positioned under the end 22 of the blade 18 and the lower end of the chute 20 forms a discharge end directed away from the frame 12 so that snow or other debris removed by the blade 18 from the vehicle roof is shunted off by the chute 20 and falls outside the frame 12. The blade 18 is preferably angled at approximately 42° with respect to the lateral axis of the frame 12 (in the orientation of FIG. 5, the lateral axis of frame 12 is aligned with the vertical axis of the page).

The frame 12 includes a pair of posts or vertical supports 30, 32 and a crossbar or crossbeam 28 extending between the upper ends of the posts 30, 32. A light 70 may be mounted on the crossbar 28. The lower ends of the posts 30, 32 are secured within a pair of rearward extending concrete footings 72, 75, which provide a stable base for the frame 12. As best shown in FIGS. 1, 3, and 5, additional diagonal support struts 84, 86 may be used to provide additional support or bracing for the posts 30, 32, the lower ends of the struts 84, 86 being attached to the concrete footings 72, 75.

An additional concrete footing 74 may extend forward of the concrete footing 75, as shown in FIGS. 1 and 5. A shield or fence 88 may be extend forward from the post 32 and be secured to a fence post extending upward from the additional footing 74 so that when snow or other debris falls down the chute 20, the snow or debris is prevented from entering the open region 14 between the posts 30 and 32, thus keeping the driving path of the vehicle approaching and passing under the frame 12 and the blade 18 clear. Preferably, the chute 20 is adjustably mounted with respect to the frame 12, and may include an insert formed from rubber or the like that contacts the side of the vehicle, thus forming a non-damaging seal to prevent snow or other debris from falling between the upper end 90 of the chute 90 and the side of the vehicle within the open region 14.

The blade 18 is pivotally mounted on the posts 30, 32 by pivot assemblies connections 52, 50, respectively. The blade 18 is secured to a crossbar 34, which extends between forward ends of a pair of arms 36, 38. The arms 36, 38 are pivotally secured to the posts 30, 32 at pivot assemblies 52, 50, respectively, near the upper ends of the posts 30, 32. It should be understood that any suitable type of pivot assembly may be utilized.

Figure 4:
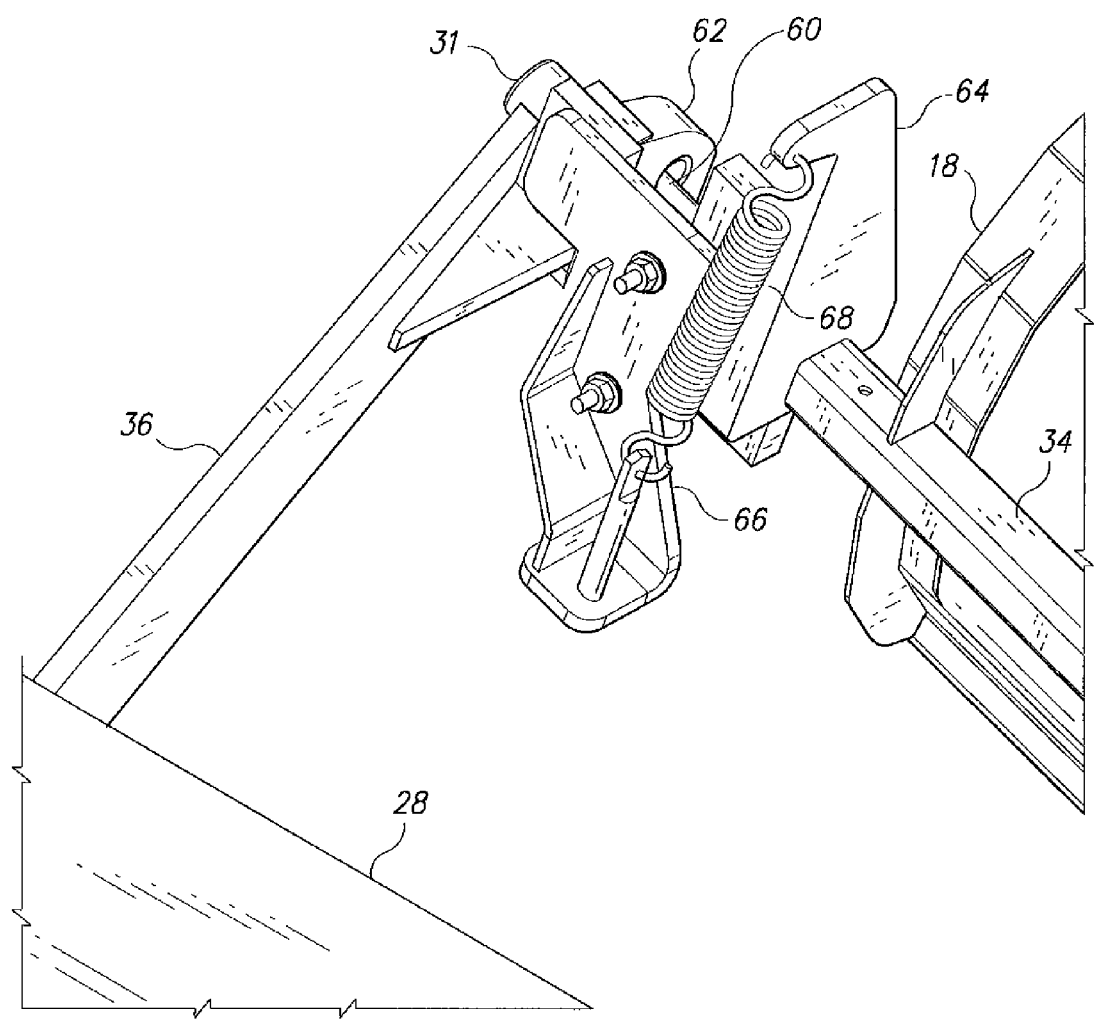
FIG. 4 is a partial perspective view of the system for removing snow from vehicles according to the present invention, showing pivotal connection between one end of a blade and the forward end of an arm of the system.

As shown in FIG. 4, one end 60 of the crossbar 34 is pivotally mounted in a bearing 62 formed on the forward end 31 of arm 36, the opposite end of the crossbar being pivotally mounted in a similar bearing at the forward end of the other arm 38. The crossbar 34 may be formed from square tubing and have short, cylindrical axles or stubs extending from opposite ends of the square tubing that rotate in the bearings 62. In addition to the pivotal mounting of crossbar 34 and blade 18 with respect to the arms 36, 38, the crossbar 34 is preferably spring-biased with respect to the arms 36, 38 to prevent excessive rotation therebetween. As shown in FIG. 4, a support plate 64 is preferably mounted to the crossbar 34 and extends substantially orthogonal thereto. A tension spring 68 extends between an upper end of the plate 64 and a bracket 66 secured to the arm 36. A similar structure restricts rotation of the opposite end of the crossbar 34 in the other arm 38. Additionally, it should be understood that the angle of blade 18 relative to the cross-beam 28, best seen in FIG. 5, may be reversed, so long as the forward end 21 of the blade 18 remains positioned opposite the chute 20 (i.e., the angling may be reversed if the chute 20 is positioned on the opposite side of the frame 12).

The blade 18 may be formed from any suitable material, such as steel, and may have a reinforcing plastic liner. Although shown as having a substantially C-shaped cross-section, it should be understood that the blade 18 may have any desired shape or relative dimensions. The pivot assemblies 50, 52 may be brass pivot pins inserted into height-adjustable boxes 92, 94, or any other suitable type of pivot assembly.

Additionally, as best shown in FIGS. 3 and 5, a pair of guides 40, 42 may be attached to the blade 18 and extend forward therefrom. The forward ends 41, 43 of the guides 40, 42 are preferably beveled, thus urging the pivotal movement of the blade 18 (via pivotal connections 52, 50 of arms 36, 38, respectively, with vertical supports 30, 32) when the roof of the vehicle contacts the forward ends 41, 43. The rear ends 45, 47 of the guides 40, 42 are attached to the crossbar 34. In order to further prevent excessive pivoting or rotation of the arms 36, 38 with respect to the frame 12, a pair of chains 80, 82 or cables may extend between the crossbar 34 and the frame 12.

The rear ends of the arms 36, 38 have counter-weights 56, 54 mounted thereon. Preferably, without the presence of a vehicle, the counter-weights 56, 54 are weighted (and the arms 36, 38 are properly dimensioned) so that arms 36, 38 extend substantially horizontally; i.e., the counter-weights 56, 54 are perfectly balanced with respect to the blade 18 and guides 40, 42.

It should be noted that the pivoting of one arm 36 is independent of the pivoting of the opposite arm 38 with respect to frame 12 (via the pivotal connection between the forward ends of the arms 36, 38 with crossbar 34, as shown in FIG. 4), thus allowing the blade 18 to fully contact the roof of the vehicle, even if the vehicle is off-level or slopes to one side. The frame 12 is preferably portable, and it should be understood that the system 10 may be dimensioned and configured to accommodate the particular vehicles being driven therethrough.

For most trailer-type vehicles, the system 10 may be dimensioned so that the blade 18 is balanced approximately 12.5 feet above the ground. With the pivoting of arms 30, 32, the blade 18 may be rotated to a height of approximately 13.5 feet above the ground. As noted above, the pivot assemblies 50, 52 may be brass pivot pins inserted into height-adjustable boxes 92, 94, or any other suitable type of pivot assembly, the height-adjustable boxes 92, 94 being slidably adjustable on the posts 30, 32, thus allowing the height of the pivot assemblies 50, 52 to be vertically adjusted, depending upon the type of vehicle passing through the frame 12.

The posts 30, 32 and crossbeam 28 may be formed from 8"×8¾" steel beams or the like. The guides 40, 42, using the above exemplary dimensions, may each extend approximately five feet from the forward ends 41, 43 to the blade 18. The guides 40, 42 may be formed from any suitable material that will not damage the vehicle roof, such as steel having a plastic insert or the like.

It is to be understood that the present invention is not limited to the embodiments described above, but encompasses any and all embodiments within the scope of the following claims.

I claim:

1. A system for removing snow from vehicles, comprising:
a frame defining an open inner region dimensioned and configured for passage of a vehicle therethrough, the frame including a pair of laterally opposed posts and an upper crossbeam extending between upper ends of the posts;
a pair of arms pivotally attached to the posts, each of the posts having a corresponding one of the arms attached thereto, the arms extending substantially orthogonal to the frame, the arms having a forward end and a rearward end;
a blade pivotally attached to the forward ends of the arms and extending between the arms, the blade being adapted to remove snow from a roof of the vehicle as the vehicle passes through the frame, wherein the blade is at an angle with respect to a plane defined by said frame in order to direct the snow removed from the roof of the vehicle to one side of the frame; and
a chute mounted in front of one of the posts, the chute having an open end positioned under the blade and a discharge end extending away from the frame to discharge the snow directed to one side of the frame by the angle of the blade away from the frame, thereby preventing the removed snow from accumulating in front of the frame and leaving a clear path for vehicles approaching the frame.

2. The system for removing snow from vehicles as recited in claim 1, wherein said pair of aunts are vertically adjustable on the posts to raise and lower said blade.

3. The system for removing snow from vehicles as recited in claim 1, further comprising a counterweight mounted on the rearward end of each said arm.

4. The system for removing snow from vehicles as recited in claim 3, wherein each said counterweight has a mass, the mass of the counterweights balancing the blade so that said arms extend substantially horizontally when the blade is out of contact with the roof of the vehicle.

5. The system for removing snow from vehicles as recited in claim 1, further comprising a pair of weighted footings, the posts being mounted on the footings.

6. The system for removing snow from vehicles as recited in claim 5, further comprising a third weighted footing positioned beneath the chute and extending rearward to the post in rear of the chute.

7. The system for removing snow from vehicles as recited in claim 6, further comprising a fence mounted on the third weighted footing and extending from below the chute to the post in rear of said chute for preventing debris falling from the chute from re-entering the open inner region of said frame.

8. The system for removing snow from vehicles as recited in claim 1, further comprising a forward crossbar extending between the forward ends of said arms, said blade being mounted on the forward crossbar, the forward crossbar being pivotally mounted on said arms.

9. The system for removing snow from vehicles as recited in claim 8, further comprising:
- a pair of plates extending upward from opposite ends of said crossbar;
- a pair of brackets attached to the forward ends of said arms; and
- a pair of tension springs extending between respective pairs of the plates and brackets, the springs resiliently biasing opposite ends of the blade.

10. The system for removing snow from vehicles as recited in claim 9, further comprising at least one light mounted on the upper crossbeam.

11. An apparatus for removing snow from vehicles, comprising:
- a frame defining an open inner region dimensioned and configured for passage of a vehicle therethrough, the frame including a pair of laterally opposed posts and an upper crossbeam extending between upper ends of the posts;
- a pair of arms pivotally attached to the posts, each of the posts having a corresponding one of the arms attached thereto, the arms extending substantially orthogonal to the frame, the arms having a forward end and a rearward end;
- a forward crossbar extending between the forward ends of the arms, the crossbar being pivotally attached to the arms;
- a blade mounted on the forward crossbar, the blade being adapted to remove snow from a roof of the vehicle as the vehicle passes through the frame;
- a pair of plates extending upward from opposite ends of said crossbar;
- a pair of brackets attached to the forward ends of said arms; and
- a pair of tension springs extending between respective pairs of the plates and brackets, the springs resiliently biasing opposite ends of the blade.

12. The system for removing snow from vehicles as recited in claim 11, wherein said pair of arms are vertically adjustable on the posts to raise and lower said blade.

13. The system for removing snow from vehicles as recited in claim 12, further comprising a counterweight mounted on the rearward end of each said arm, each of the counterweights having a mass, the mass of the counterweights balancing the blade so that said arms extend substantially horizontally when the blade is out of contact with the roof of the vehicle.

14. The system for removing snow from vehicles as recited in claim 13, further comprising at least one guide member mounted on the forward crossbar and projecting forwardly therefrom.

15. The system for removing snow from vehicles as recited in claim 14, wherein said blade is at angle with respect to a plane defined by said frame in order to direct the snow removed from the roof of the vehicle to one side of the frame.

16. The system for removing snow from vehicles as recited in claim 15, further comprising a chute mounted in front of one of said posts, the chute having an open end positioned under the blade and a discharge end extending away from the frame to discharge the snow directed to one side of the frame by the angle of the blade away from the frame, thereby preventing the removed snow from accumulating in front of the frame and leaving a clear path for vehicles approaching the frame.

17. The system for removing snow from vehicles as recited in claim 16, further comprising a pair of weighted footings, the posts being mounted on the footings.

\* \* \* \* \*